US005164123A

United States Patent [19]

Goudy, Jr.

[11] Patent Number: 5,164,123

[45] Date of Patent: Nov. 17, 1992

[54] ENCAPSULATION OF TOXIC WASTE

[75] Inventor: Paul R. Goudy, Jr., Bayside, Wis.

[73] Assignee: Waste Seal, Inc., Milwaukee, Wis.

[21] Appl. No.: 216,931

[22] Filed: Jul. 8, 1988

[51] Int. Cl.[5] .................... G21F 9/16; B29C 37/02; B05D 7/00

[52] U.S. Cl. .................... 252/628; 264/0.5; 264/25; 264/138; 264/141; 423/DIG. 20; 427/6; 427/214; 427/220; 427/221; 427/407.1

[58] Field of Search .............. 252/628, 631; 425/113, 425/DIG. 16, 196, 547, 289; 423/DIG. 20; 427/6, 220-221, 214, 407.1; 264/0.5, 25, 138, 141, 210.1; 976/DIG. 376, DIG. 385, DIG. 394

[56] References Cited

U.S. PATENT DOCUMENTS

| | | | |
|---|---|---|---|
| 3,463,738 | 8/1969 | Fitzgerald et al. | 252/628 |
| 3,993,579 | 11/1976 | Bunnell et al. | 252/628 |
| 4,016,095 | 4/1977 | Ambardanishvili et al. | 250/493 |
| 4,021,363 | 5/1977 | Standart et al. | 252/628 |
| 4,077,901 | 3/1978 | Arnold et al. | 252/628 |
| 4,118,354 | 10/1978 | Harada et al. | 252/628 |
| 4,230,597 | 10/1980 | Bustard et al. | 252/628 |
| 4,242,220 | 12/1980 | Sato | 252/628 |
| 4,299,721 | 11/1981 | Hirano et al. | 252/628 |
| 4,702,862 | 10/1987 | Ledebrink | 252/628 |
| 4,708,822 | 11/1987 | Fukasawa et al. | 252/628 |
| 4,756,681 | 7/1988 | Unger et al. | 252/628 |
| 4,772,430 | 9/1988 | Sauda et al. | 252/628 |

*Primary Examiner*—Howard J. Locker

[57] ABSTRACT

A method of encapsulating a toxic material with a resinous plastic wherein the toxic material is admixed and coated with the resinous plastic to result in an encapsulated product having a protective skin thereover. The method involves an extrusion step followed by a severing of the extruded product into discrete particles for either subsequent injection or compression molding or additional extruding with additional resinous plastic. Geometric forms result which can indicate the type of toxic material as well as be of a size so as not to be ingested by animals and have imprinted warning indicia. Liquid as well as solid toxic materials can be encapsulated.

12 Claims, 1 Drawing Sheet

WASTE MATERIAL
LIQUID OR SLURRY
CLARIFIER
FILTER PRESS
DRIER
HOPPER
TWIN SCREW EXTRUDER
WATER BATH
GRINDER
INJECTION OR IMPRESSION MOLDING
PLASTIC RESIN
DANGER DANGER
GER DANGER
10
11
12
13
14
15
17
18
20
21
23
25
26
27
28
29
30
31
33
34
35

ENCAPSULATION OF TOXIC WASTE

BACKGROUND OF THE INVENTION

This invention relates to the disposal of toxic waste products. More particularly, it relates to the encapsulation of toxic metals with resinous plastic so that the toxic materials can be properly disposed of.

In U.S. Pat. No. 4,702,862 there is stated in the background of the invention that it is known to mix polyvinylchloride or polyethylene with radioactive waste and pass the mixture through a heated extruder. The mixture is subsequently cast into compact plastic blocks for final storage. This particular patent is an improvement over that process in that radioactive thermoplastic synthetic material is the matrix material. It is also known in the prior art to utilize resinous plastic such as polyethylene to encapsulate a radio active solution in order to form a solid and essentially nonporous, rigid polyethylene body which can be stored either above or below the ground. This is described in U.S. Pat. No. 3,463,738. In U.S. Pat. No. 3,993,579 powdered toxic, high-level radioactive waste is encapsulated in a vitreous carbon which is obtained by carbonizing a resin. The vitreous carbon shapes can be further protected for storage by encasement in a canister with molten aluminum placed around it. Radioactive wastes are also encapsulated in U.S. Pat. No. 4,077,901 wherein a fluid thermosettable resin composition is employed which is of the vinyl ester or unsaturated polyester type. Radioactive wastes are also of concern in U.S. Pat. No. 4,299,721 wherein a container is filled with a predetermined amount of pellets of the radioactive waste and the container then filled with a thermoplastic composition in the molten state. Similarly, U.S. Pat. No. 4,708,822 utilizes pellets of radioactive waste material encapsulated in a cross-linked plastic resin.

It has now been found that an improvement over the prior art processes can be provided especially in the field of disposing of nonradioactive wastes if the toxic materials are encapsulated in a resinous plastic so that a skin of plastic material is provided over the toxic waste material. Neither do the prior art processes teach the use of a two-step process in which the waste materials are first admixed with a resinous plastic and then subsequently processed with additional resinous plastic or with additional molding. This provides the individual waste elements with a coating of resinous plastic as well as the exterior skin. An encapsulated waste product results which is nonporous and inert to all naturally occurring solvents in the environment. An additional factor not considered in the prior art is that the waste material is generally hydroscopic and contains large quantities of water. This causes a boiling of the water in an extruder and in turn irregularities in the surface of the extruded material. The moisture problem is the reason resins and fillers must be completely dry when carrying out current molding processes.

It is an advantage of the present invention to provide a novel encapsulation method for waste materials.

Another advantage is a novel product composed of toxic waste materials which are encapsulated in a plastic matrix such that the materials will not migrate or leach from the matrix.

It is another advantage of this invention to provide a novel method for encapsulating waste materials in a plastic matrix which includes an extruding of the waste material with a plastic resin and subsequent processing steps of regrinding or chopping and subsequent encapsulation.

Another advantage is an encapsulation method wherein the waste products are encapsulated in a body of plastic material which has a film formed over the outside thereof.

Yet another advantage of this invention is a method of the foregoing kind which can be carried out by available molding equipment.

Still another advantage of this invention is a product of the foregoing type which can be formed with indicia marked thereon so as to indicate the potential danger of the encapsulated product.

Other advantages are: an encapsulated product of the foregoing type which because of its size cannot be easily ingested; minimizes exposed surfaces with respect to the volume of the product to reduce potential exposure of the waste product; inhibits UV light absorption for the above described product if stored above the ground; is chemically inert to all naturally occurring substances; permits future reclamation of the waste product and in the event of fracture or cutting, minimizes exposure of the waste material; and affords the encapsulation of liquids.

SUMMARY OF THE INVENTION

The foregoing advantages are accomplished and the shortcomings of the prior art are overcome by the present encapsulating method wherein a toxic material is admixed using an extrusion step with a resinous plastic so as to coat the toxic material. The coated material is subsequently severed into discrete particles such as by grinding and is further treated via extrusion or molding so as to form a composite of the ground toxic material with the resinous plastic and with a skin or film of encapsulating resinous plastic surrounding the composite.

In one embodiment, the coated and severed toxic material is further treated by an injection or a compression molding step.

In still another embodiment, the coated and severed toxic material is treated by extruding it a second time with the addition of resinous plastic material.

Preferably, the toxic material is added in an amount of about 50–90% by weight and the resinous plastic material is added in an amount of about 50–10% by weight.

Also in a preferred manner, the encapsulated toxic waste product is formed in a coded geometric configuration which can be of sufficient size so as not to be easily ingested by an animal and/or can have a warning statement embedded into it.

BRIEF DESCRIPTION OF THE DRAWING

A better understanding of the present method and encapsulated waste material product will be accomplished by reference to the drawing wherein.

DETAILED DESCRIPTION OF THE PREFERRED EMBODIMENT

Figures 1, 2, 3, 4:
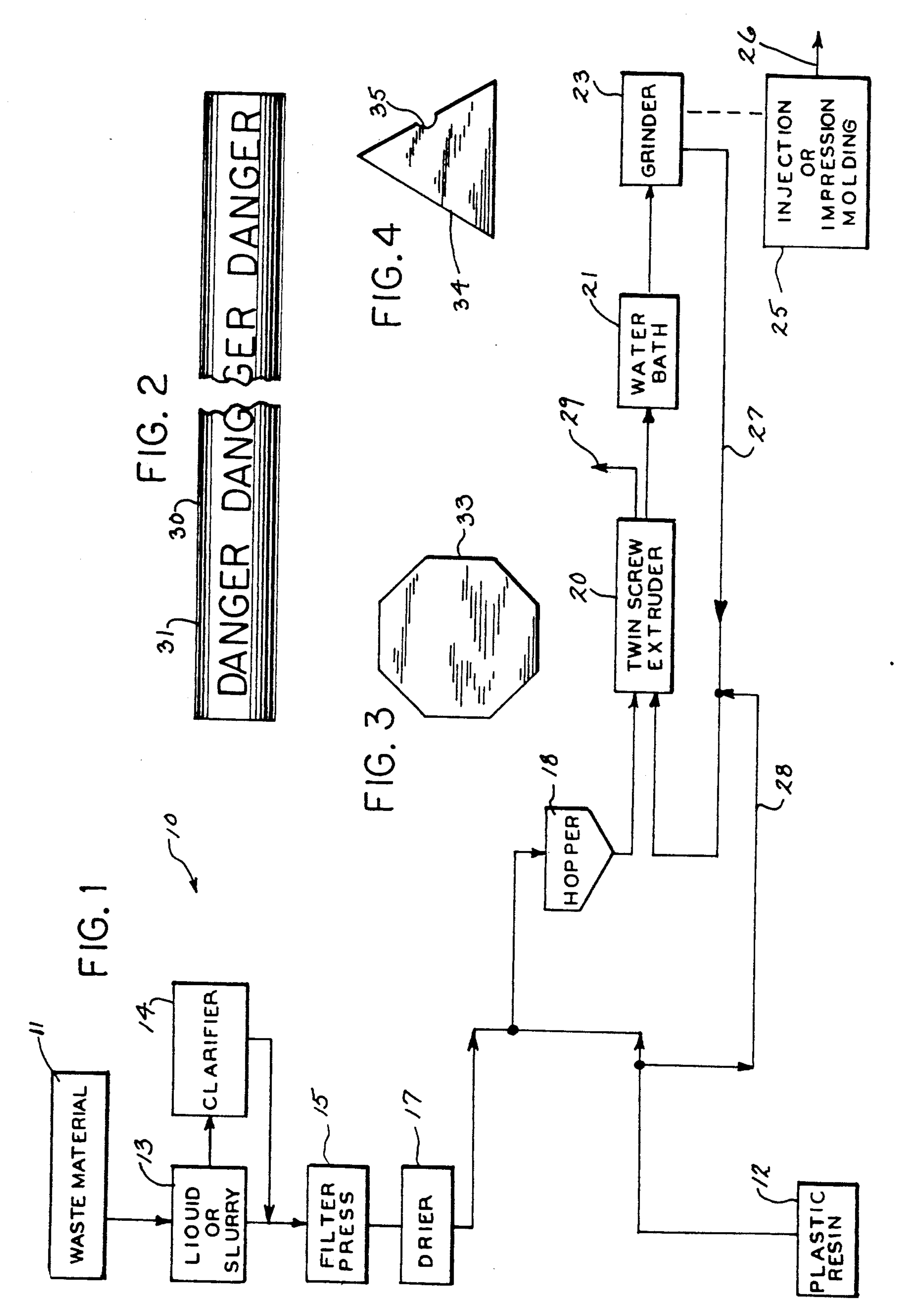
FIG. 1 is a schematic view illustrating the method of this invention.
FIG. 2 is a side elevational view of a typical product produced by the method of this invention.
FIGS. 3 and 4 are end views showing additional products produced by the method of this invention.

The method generally 10 is indicated in FIG. 1 of the drawing with the numeral 11 indicating a source of waste material and the numeral 12 a source of resinous plastic material. Preferably, the plastic resin will be a low density polyethylene having a melting point not exceeding about 125° C. and containing the usual fillers. While a pellet form of the resin is preferred, other forms such as flakes can be employed with the important factor being that the resin provides lubricity when in the melted state. The waste material in this instance is a cadmium metal which would be discarded from the usual metal plating operation. It will normally be in a liquid or slurry state as indicated at 13. In order to reduce the volume of the cadmium waste material it is initially processed in a clarifier 14 and subsequently in a filter press 15 to reduce the material to a solids content of about 33% by weight. After passing it through the filter press 15 the material is placed in a dryer 17 so as to reduce the material to a solids content of about 85% by weight and a moisture content of about 15% by weight. The partially dried waste material will then be combined in a hopper 18 with the plastic resin 12.

In the method described herein, the amount of waste material 11 will always exceed the amount of plastic resin 12. It has been found that a range of 50–90% by weight of the partially dried waste material 11 works well with a range of 50 to 10% by weight of the resin 12. An important factor in combining the resin with the waste material is a balancing of the resin with the waste material on a volume to volume basis. This means more waste can be added to the resin if the resin has a maximum volume such as would be the case if the resin were in a shaved-like state or flaked form to provide maximum volume.

After thoroughly mixing the materials in the hopper 18 they are placed in an extruder 20 which preferably is of the twin screw type. The extruder 20 in this instance is a BTS Twin Screw Compounding Extruder available from Killion Extruders, Inc. in Cedar Grove, N.J. The composite waste material and resinous plastic as it leaves the extruder 20 will be in a cylindrical form with the waste material coated with the resinous plastic and the resinous plastic providing a matrix. It is quite porous in the center due to the expansion caused by boiling of the moisture content of the waste material 11. The extruded material is then introduced into a water bath 21 for cooling which will add some water on the surface of the extruded material. After cooling the extruded material, it is placed in a grinder or chopper 23 where it is severed by grinding to a pellet size form which resembles the form of the original plastic resin 12. At this stage, the severed material can be subjected to an injection molding or compression molding step using the usual injection molding or compression molding equipment. This is indicated at 25 to result in a final product form 26. No additional plastic is added and during the injection or compression molding the product 26 results which can have the geometric form of a disk with a diameter of 2¼ inches and thickness of ¼ inch and a skin or film over the surface. It is this skinning which is an important feature of the invention so as a produce a composite and encapsulated waste product which will not allow a leaching or migration of the waste material out of the product 26.

As an alternative, the ground pellet-size material can be returned to the extruder 20 such as indicated at return line 27. In this instance, an additional 10% by weight of resin 12 based on the weight of the waste material 11 is added to the previously extruded and ground material for placement again in the extruder 20. This additional plastic resin 12 is indicated by the feed line 28. With the additional amount of plastic resin 12, the twice extruded material is not only formed in a composite mass with plastic coated waste material but also has an encapsulating skin over the extruded final product 29 as it leaves the extruder 20. As stated in conjunction with the injection and compression molding step 25 the twice extruded final product 29 has an outer skin or film which is an important feature.

The following Example shows 5 runs which were made using the cadmium waste material and low density polyethylene. The Killion twin screw extruder as previously described was used. The amounts of waste material and polyethylene are expressed in weight percent while temperatures for the barrel and die zones and the die are in degrees centigrade.

EXAMPLE

| Run | Waste Material/ Polyethylene | RPM | Barrel Zone 1 | Barrel Zone 2 | Barrel Zone 3 | Barrel Zone 4 | Die Zones 1 | Die Zones 2 | Die | Pres. Lbs. | Amps |
|---|---|---|---|---|---|---|---|---|---|---|---|
| 1 | 70/30 | 60 | 150 | 150 | 150 | 150 | 150 | 150 | 150 | 220 | 7 |
| 2 | 60/40 | 60 | 140 | 140 | 150 | 150 | 150 | 150 | 150 | 500 | 10 |
| 3 | 80/20 | 160 | 150 | 150 | 150 | 150 | 150 | 150 | 150 | 540 | 9 |
| 4 | 70/30 | 120 | 80 | 150 | 160 | 180 | 200 | 210 | 220 | 300 | 12 |
| 5 | 70/30 | 100 | 90 | 110 | 120 | 140 | 150 | 160 | 160 | 900 | 15 |

It should be pointed out that from the standpoint of handling moisture in the extruder, that Runs 4 and 5 represent the more feasible approach. There it is seen that lower temperatures are used initially in barrel zone 1 with a gradual and progressive increase in zones 2–4. This helps reduce water build-up in the feed section and reduces the moisture content of the product. It should also be pointed out that the extruder is vented to allow the escape of moisture. However, not all moisture is removed but is encapsulated in the plastic matrix.

The metal content of the encapsulated waste products 26 and 29 is an added advantage in protecting it from ultraviolet light. In this instance, and if desired, a quantity of carbon black could be added to the resin or in the hopper 18 for additional UV protection.

The once extruded material as it leaves the extruder 20 is irregular in its shape and has bubbles confined in it as well as being a relatively weak material from a physical structure. This is the reason the additional injection or compression molding step 25 or the recycling as indicated by line 27 is required. Moisture is a problem in employing only a single pass of the material through the extruder 20 as it produces a product with gross irregularities and porosities. This is solved by the double extrusion step or the injection or compression molding steps wherein the moisture bubbles are compressed and the lighter plastic material is directed to the outside to form the encapsulating skin.

The product as indicated by the numeral 29 as it leaves the extruder 20 was about ¼ inch in diameter.

However, it can be of various diameters and lengths. For example, a rod could be formed which would be 1-2 inches in diameter and be of a length 10-20 feet long. It could have warnings imprinted or embedded into it. This is shown at 30 in FIG. 2 with the outer skin being indicated by numeral 31. Preferably, the encapsulated product will be of the size so in the event it would be exhumed it is not easily ingested by a non-human. The same would apply concerning the product 26 and its geometric shape and size as it is injection or compression molded. FIGS. 3 and 4 represent additional products 33 and 34 which can be encapsulated and formed into coded geometric configurations by the two-step method of this invention. In this instance product 33 is octagonal in shape and would indicate a nickel encapsulated product whereas product 34 is triangular and would indicate cadmium. A groove 35 can be provided in product 34 to serve as a further code indentification or indicia.

In order to assure that the encapsulated waste product 26, 29 or 30 are properly encapsulated in the plastic material 12, it can be easily analyzed by readily available equipment and methods to determine the uniformity of the mixture of the plastic 12 and the waste material 11.

A twin screw extruder 20 is preferably employed in the previously indicated method or process. Any extruder such as a single screw extruder which is properly sized could be substituted for both the initial extruding and the subsequent extrusion with the additional plastic material 12. This also will effect the necessary skinning of the plastic material over the waste product.

The preferred plastic material is low density polyethylene. However, other low melting thermoplastic resins such as polypropylene or polyvinyl chloride could be substituted as well as higher melting temperature resins. Thermoplastic resins which are generally softer than thermosetting resins are preferred because of the regrinding step. An advantage of this method and the resulting product which will preferably be buried in the ground is that virgin-type plastic need not be employed but recycled plastic materials could be utilized. This would substantially reduce the cost of the method.

In the method described previously, cadmium metal normally disposed of from a metal plating process is exemplified in the method of this invention. This material offers the advantage of reducing bacterial degrading of the plastic matrix. Obviously, other solid toxic waste materials whether in a liquid media or a dry one or a combination of both could be encapsulated. Of course in the instance where the liquid media would be other than aqueous, such as an organic solvent material, precautions would have to be taken to either remove the solvent or have it be compatible with the resin into which the toxic waste material is to be encapsulated.

The method has preferably been described in conjunction with a waste material in a liquid or slurry form 13 wherein the moisture content is reduced by use of a clarifier 14, a filter press 15 and a dryer 17. These steps 14, 15 and 17 could be eliminated as, depending on the waste material, it has been found that waste material with as high as 68% moisture can be encapsulated using the method of this invention. Accordingly, a moisture range of 70-0% in the waste can be used and would work with any waste material. Also, a preferential range of 50-90%, including moisture, for the waste material is indicated. If desired 90% or above waste material could be utilized if the starting resinous plastic 12 were in a high volume flake form. This is quite unexpected considering the abrasive properties of the metal in the waste material and the fact that an encapsulated product results with the addition of only 10% resinous plastic based on the weight of the waste material when the extrusion step is employed.

As indicated previously, waste materials with high moisture contents are operable in the herein described method. Accordingly the method of this invention can be used to encapsulate liquids using the solid waste material as a metering or carrier vehicle for adding the liquid to the resinous material. In such instance the solid material can be toxic or nontoxic and the liquid also can be either toxic or nontoxic.

It will thus be seen that through the present invention there is now provided a novel plastic encapsulated product which can be disposed of in a safe and efficient manner. Even in a worse situation as to the disposal of the encapsulated waste material the plastic matrix would serve as a "controlled" release of the waste material such as where it may be eroded away such as by bacterial activity. The method of this invention is economical in that it can utilize relatively inexpensive plastic materials and when desired those plastic materials which are recyclable. The encapsulated product offers the advantage of having a warning statement imprinted thereon and of a size so that it cannot be easily ingested by non-human animals. Further, if desired, the material could be reclaimed at a later date by melting the plastic material from it. The coded product shapes 33 and 34 would assist in identifying the metal.

The method as described herein also lends itself to being portable. This means it could be located in a mobile unit which could operate at a plant site. This mobility also aids in ease of certification of the method by governmental agencies.

The foregoing invention can now be practiced by those skilled in the art. Such skilled persons will know that the invention is not necessarily restricted to the particular embodiments presented herein but the scope of the invention is to be defined by the terms of the following claims as given meaning by the preceding description.

I claim:

1. A method of encapsulating a toxic material with a resinous plastic comprising:
   - initially admixing a toxic material with a resinous plastic so as to coat said toxic material;
   - severing said coated toxic material into discrete particles suitable for further treatment in a plastics extruder; and
   - subsequently extruding said severed and coated toxic material while adding additional resinous plastic thereto so as to form a composite of said severed toxic material and with said resinous plastic and a film of encapsulating resinous plastic surrounding said composite.

2. The method of claim 1 wherein said initial coating of said toxic material is effected by extruding said toxic material with said resinous plastic.

3. The method of claim 2 wherein said extruding is effected while simultaneously increasing the temperature of said admixed toxic material and resinous plastic in a gradual and progressive manner.

4. The method of claim 1, wherein said additional resinous plastic material is in an amount of about 10% by weight based on the weight of said toxic material.

5. The method of claim 1 wherein said resinous plastic material is polyethylene.

6. The method of claim 1 wherein said toxic material includes in part a solid material.

7. The method of claim 1 wherein said severed and coated toxic material is cooled prior to said extrusion step.

8. A method of encapsulating a toxic material with a liquid material in a resinous plastic comprising:

initially admixing a solid material with a liquid in a resinous plastic so as to coat said toxic material and encapsulate said liquid, one of said solid material or said liquid being toxic;

severing said coated toxic material into discrete particles suitable for further treatment in a plastics extruder; and subsequently extruding said severed and coated toxic material while adding additional resinous plastic thereto so as to form a composite of said severed toxic material and said liquid with said resinous plastic and a film of encapsulating resinous plastic surrounding said composite.

9. The method of claim 8 wherein said solid material is toxic and provides a metering vehicle for said liquid during said admixing step.

10. The method of claim 8 wherein said solid material is nontoxic and provides a metering vehicle for said liquid during said admixing step.

11. The method of claim 8 wherein said liquid is a toxic material.

12. The method of claim 8 wherein said liquid is a nontoxic material.

* * * * *